United States Patent [19]

Miyazaki

[11] Patent Number: 4,671,545
[45] Date of Patent: Jun. 9, 1987

[54] FEMALE-TYPE COUPLING NIPPLE

[75] Inventor: Takeshi Miyazaki, Nagoya, Japan

[73] Assignee: Toyoda Gosei Co., Ltd., Nishikasugai, Japan

[21] Appl. No.: 823,204

[22] Filed: Jan. 28, 1986

[30] Foreign Application Priority Data

Jan. 29, 1985 [JP] Japan .................... 60-010991[U]

[51] Int. Cl.⁴ .......................................... F16L 25/00
[52] U.S. Cl. ................................ 285/334.5; 285/384; 285/382.5
[58] Field of Search ................ 285/334.5, 384, 353, 285/261, 263, 334.4, 917, 382.5

[56] References Cited

U.S. PATENT DOCUMENTS

| 882,406 | 3/1908 | Morgan | 285/334.5 X |
| 1,987,100 | 1/1935 | Dick | 285/334.5 X |
| 3,698,745 | 10/1972 | Munlt | 285/334.5 X |

FOREIGN PATENT DOCUMENTS

| 2817438 | 10/1979 | Fed. Rep. of Germany | ... 285/334.5 |
| 2820337 | 11/1979 | Fed. Rep. of Germany | ... 285/334.5 |
| 1367405 | 9/1974 | United Kingdom . | |
| 1513551 | 6/1978 | United Kingdom . | |
| 2032035 | 4/1980 | United Kingdom | ............... 285/384 |

Primary Examiner—Dave W. Arola
Attorney, Agent, or Firm—Cushman, Darby & Cushman

[57] ABSTRACT

A female-type coupling nipple including a coupling body and a nipple. The nipple includes a cylindrical nipple section and an end section which is provided with plastic working so that its outside diameter can expand. The outside wall of the end section and inside wall of the connecting section of the coupling body are closely joined both by elastic force that acts in the directions of outside diameter expansion of the end section and reaction force of the connecting section.

4 Claims, 8 Drawing Figures

FEMALE-TYPE COUPLING NIPPLE

BACKGROUND OF THE INVENTION

1. Field of the Invention

This invention relates to a female-type coupling nipple and is used for brake hoses and the likes or applicable to flared-type pipe joints.

2. Discussion of the Background

It is known that there are two types of coupling for use with brake hoses and the like. One is an one-body type 60 (FIG. 7) literally made of one block of material, and the other is a consolidated type 70 (FIG. 8) so made that a nipple 72 worked beforehand is inserted into a coupling body 71 and joined therewith by means of caulking, (i.e., squeeze-forming, e.g. crimping) brazing or welding.

It is known that in both said one body and consolidated types of coupling, the seat surfaces 61 and 73, the nipple 72 and the coupling body 71 must be provided with a precise working so that the seat surfaces 61 and 73 can be concentric and fitting with mate parts each other. In the consolidated-type coupling 70, troublesome process such as caulking or welding must be provided therewith so that the nipple 72 and the coupling body 71 can be integrated with each other.

SUMMARY OF THE INVENTION

Accordingly, one object of the present invention is to provide a female-type coupling nipple which does not require so precise working as is required by the conventional types of coupling.

Another object of the present invention is to provide a female-type coupling nipple which can join a nipple with a coupling body with ease.

Still another object of the present invention is to provide a female-type coupling nipple providing superior sealing effects without necessitating precision working.

Briefly, these objects and other objects of the present invention as hereinafter will become more readily apparent can be attained by a female-type coupling nipple which is comprised of a coupling body and a nipple. The coupling body comprises a central section having a through-hole of small diameter, a sleeve section constituting an integral extension of the central section and having a sleeve hole of large diameter to communicate coaxially with the through-hole, and a connecting section having a connecting hole of large diameter. The nipple comprises a cylindrical nipple section having outside diameter approximately equivalent to the bore of the through-hole in the central section and an end section being formed at one end of the nipple section and having outside diameter approximately equivalent to the bore of the connecting hole in the connecting section.

The cylindrical nipple section of the nipple is inserted from the connecting hole through the through-hole in the central section into the sleeve hole and coaxially positioned inside the sleeve hole in the sleeve. The end section of the nipple is provided with a plastic working so that its outside diameter can expand while it is being set into the connecting hole in the connecting section of the coupling body, and the outside wall of the end section and inside wall of the connecting section are closely joined with by both elastic force that acts in the directions of outside diameter expansion of the end section and reaction force of the connecting section.

BRIEF DESCRIPTION OF DRAWINGS

A more complete appreciation of the invention and many of the attendant advantages thereof will be readily obtained and the same become better understood by reference to the following detailed description when considered in connection with the accompanying drawings wherein.

DETAILED DESCRIPTION OF THE PREFERRED EMBODIMENT

Figure 1:
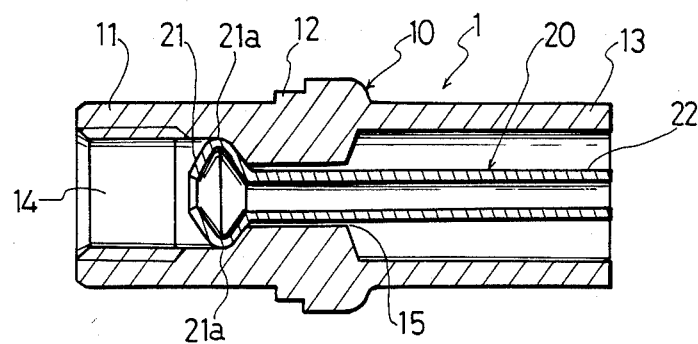
FIG. 1 is a cross-sectional view of the female-type coupling nipple according to Example 1.

The through-hole of the central section in the coupling body means a portion into which the nipple section of the nipple is inserted and therefore has an equivalent or larger inside diameter as or than the outside diameter of the nipple section.

The sleeve hole means a portion into which the hose section of brake hose and the like is inserted.

The connecting section in the coupling body means a section that is provided with a connecting hole so that mating parts and the end section of nipple described hereinafter can be inserted thereinto and joined therewith. Consequently, the inside diameter of the connecting hole is worked approximately to the outside diameter of the inserting portion of the mating parts, wherein the connecting hole and the mating parts can be joined with each other by the use of screw threads or other conventional means.

These indicate the possibility that the coupling body comprised in a female-body coupling nipple according to this invention may be substantially the same in shape and material as the conventional consolidated types of coupling body, and many different kinds of material such as steel and copper are conventionally used for making the coupling body.

The nipple referred to herein means a component that comprises an end section and a nipple section, wherein the nipple section is of cylindrical shape with outside diameter that is approximately equivalent to the inside diameter of a hose to be inserted into said sleeve hole, and thereby allows the flow of fluid from the hose or mating parts into mating parts or hose through the connecting hole.

The end section of the nipple, which constitutes a feature of this invention, has an outside diameter approximately equivalent to the inside diameter of the connecting hole of the connecting section in said coupling body, and is closely joined with the connecting hole when its peripheral wall is pressed against the inside wall of the connecting hole by both its own elastic force and the reactive force from the connecting section. The end section of the nipple may be of funnel shape, wherein its opening section develops toward the opening end, or of bulged V- or U-shape in any axial cross-section. V-shape means a shape with the extreme end of the bulge forming an acute angle, and U-shape means a shape with the extreme end of the bulge forming an obtuse angle. The end section of the funnel shape allows its sticking to the inside wall of the connecting hole by providing a plastic working in such directions that the opening angle of the end section develops. The end section of V- or U-shape allows its sticking to the inside wall of the connecting hole with the bulge developing in the diameter directions by providing a plastic working in such a direction that the ends of the V- or U-shape are approaching each other, wherein the end section receives elastic force in the axial and diameter directions and thereby more secure fitting to the inside wall of the connecting hole can be desirably achieved. The end section of V- or U-shape, can be formed by being provided with bulging or other means one end of a pipe whose outside diameter is substantially uniform.

It is desirable that the inside wall of the connecting hole in the coupling to which the end section of the nipple joins should be of such shape that matches the shape of the end section so that the contacting area can be large and the fitness can be improved.

Said nipple is made of steel, copper, aluminum or any other kinds of metal or alloy according to the application purpose. And if the nipple is made of spring steel, the end section can be elastically joined to the inside wall of the connecting hole in the coupling body.

One of the typical methods for closely joining the end section of the nipple, which is provided with a plastic working to the inside wall of the connecting hole, is pressing by the use of a punch or the like. In pressing by the use of a punch or the like, it is desirable that the end section is formed according to the shape of the mating parts by selecting a proper punch of the pressing shape. If necessary, the end section may be provided with a plastic working while inserting the mating parts ito the connecting hole and fixing it thereto.

A female type coupling according to the present invention is closely fixed along the inside wall of the connecting hole in the coupling body by means of a plastic working provided for the end section of the nipple, and thereby the effect of fluid sealing is achieved. This device dispenses with much of the accuracy that is required conventionally in the formation of the coupling body. As a result, the coupling body can be formed simply by applying pressure over tubular materials, and the nipple does not require welding or caulking for fixation. Further, the end section of the nipple can be formed with the shape of the mating parts so easily that the seat area is easily formed and superior sealing effects are obtained without applying precision working.

Having generally described this invention, a further understanding can be obtained by reference to certain specific examples which are provided herein for purposes of illustration only and are not intended to be limiting unless otherwise specified.

EXAMPLE 1

FIG. 1 is a sectional view of the female-type coupling nipple 1 designed for use with an automobile brake hose.

Said female-type coupling nipple 1 is in the form of cylinder, and comprises a coupling body 10 and a nipple 20. The coupling body 10, made of soft steel and provided with a cold forging and machining, comprises a connecting section 11 having a connecting hole 14 of 9.5 mm in diameter, a thick wall central section 12 having a through-hole 15 of 3.7 mm in diameter and a sleeve section 13 for receiving a hose.

A nipple 20 is made of a soft steel pipe of 3.6 mm in outside diameter and 2.3 mm in inside diameter. Its end section 21 is provided with bulging beforehand to form a bulge of V-shape in any axial cross-section. The maximum outside diameter of the end section 21 prior to pressing is 9.3 mm. The nipple 20 is integrally joined with the coupling body 11, wherein the bulge 21a of the end section 21 and the outside wall constituting an integral extension of the bulge 21a and developing toward the nipple section 22 are pressed to the inside wall of the connecting section 11 adjacent to the through-hole 15.

Figure 2:
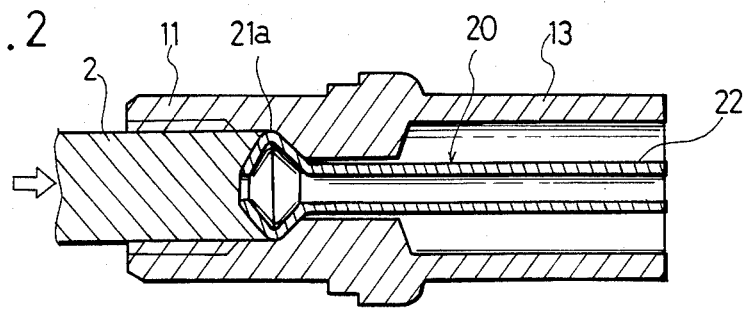
FIG. 2 is a cross-sectional view of the female-type coupling nipple according to Example 1 which shows the end section of the nipple being pressed to the coupling body.
Figure 3:
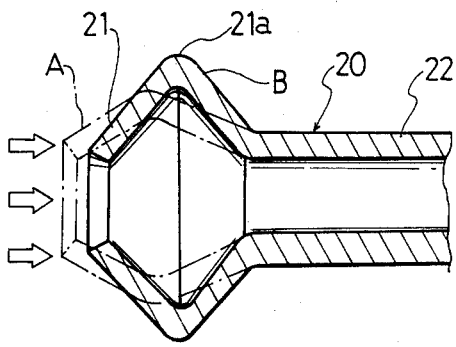
FIG. 3 is a cross-sectional view of the female-type coupling nipple according to Example 1 which shows the change in the shape of the end section of the nipple.
Figure 4:
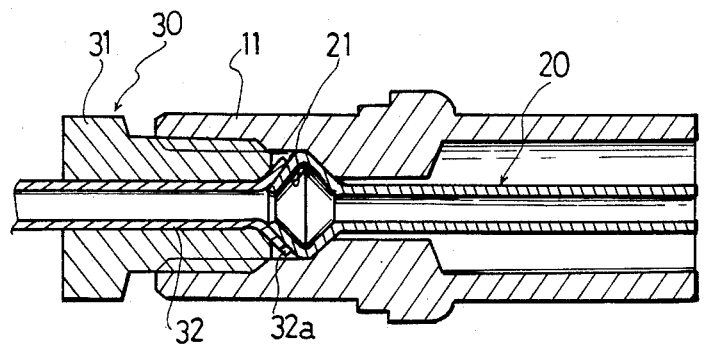
FIG. 4 is a cross-sectional view of the female-type coupling nipple accoding to Example 1 which shows the nipple being coupled with mating parts.

Said female type coupling nipple 1 is formed as follows:

The nipple section 22 of the nipple 20 provided with bulging beforehand is inserted into the through-hole 15 from the side of the connecting section 11 of the coupling body 10. Then, as shown in FIG. 2, a punch 2 is rammed into the connecting section 11 to press the end section 21 of the nipple 20 toward the sleeve 13. By this working, as shown in FIG. 3, the bulge section 21a is expanded in the diameter directions (from A to B in FIG. 3) to fit closely to the inside wall of the connecting section 11, and the outside wall of the end section 21 constituting an integral extension of the bulge section 21a closely fits the inside wall of the connecting section 11, and thereby the nipple 20 is fixed. The surface where the punch 2 and the end section 21 meet each other is the same in shape as the surface of the flare 32a of the flare pipe 32 of mating parts 30 as shown in FIG. 4, and therefore, the end section 21 is formed to fit closely to the connecting section 11 and at the same time the shape of the end section 21 matches the shape of the flare 32a. As a result, as shown in FIG. 4, when the flare pipe 32 is inserted into the connecting section 11 and the flare nut 31 is screwed into the connecting section 11, the flare 32a and the end section 21 closely fit with each other to ensure higher fluid sealing effect.

EXAMPLE 2

Figure 5:
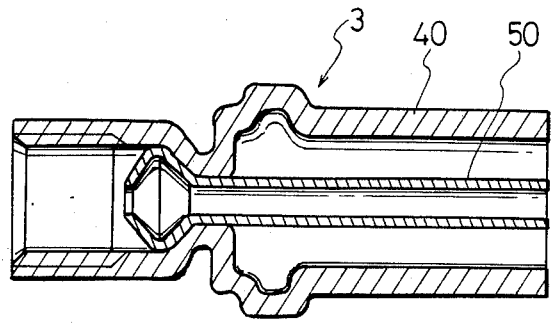
FIG. 5 is a cross-sectional view of the female-type coupling nipple according to Example 2.

FIG. 5 shows a female-type coupling nipple 3 according to Example 2 of this invention.

In said female-type coupling nipple 3, the coupling body 40 is made of a soft steel tubular pipe of 13.5 mm in outside diameter and 11.5 mm in inside diameter by means of press formation. The nipple 50 which is the same as the nipple according to Example 1 is closely joined by the use of a punch in the same way as described in Example 1. Although the coupling body is formed by far easier compared with Example 1, this female-type coupling nipple 3 has the same functions and effects as those of Example 1.

EXAMPLE 3

Figure 6:
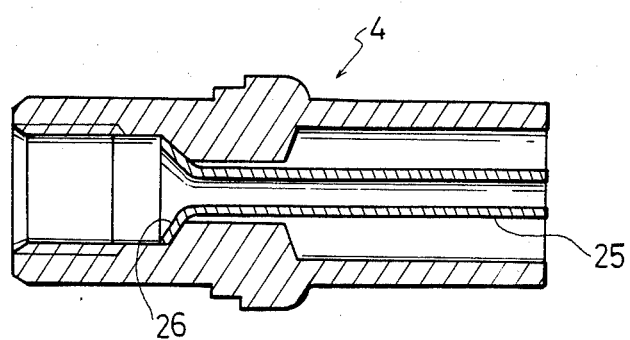
FIG. 6 is a cross-sectional view of the female type coupling nipple according to Example 3.
Figure 7:
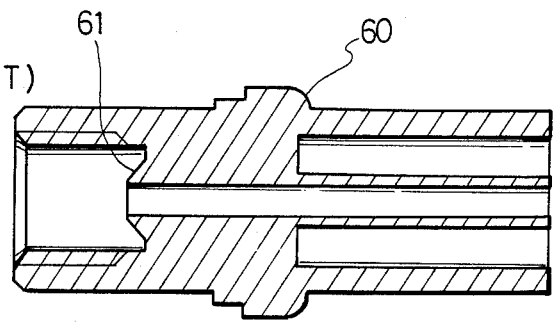
FIG. 7 is a cross-sectional view of a conventional integral body-type coupling nipple.
Figure 8:
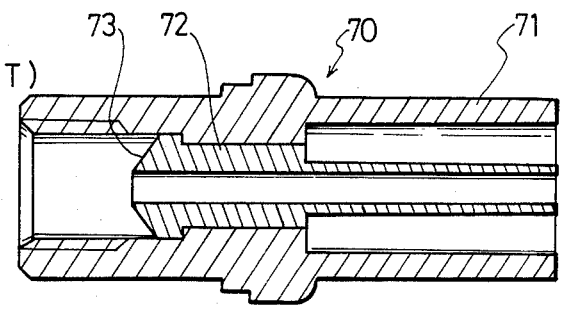
FIG. 8 is a cross-sectional view of a conventional consolidated female-type coupling nipple.

FIG. 6 shows a female-type coupling nipple 4 according to Example 3 of this invention.

In said female-type coupling nipple 4, the nipple 25 has an end section 26 and the end section 26 is of funnel shape.

The nipple 25 is closely joined while inserting the mating parts into the connecting hole, and this female-type coupling nipple 4 has the same functions and effects as those of Example 1.

Having now fully described the invention, it will be apparent to one of ordinary skill in the art that many changes and modification can be made thereto without departing from the spirit or scope of the invention as set forth herein.

What is claimed is:

1. A female-type coupling nipple, comprising:
    a coupling body which comprises a central section having a throughbore of small diameter, a sleeve section constituting an integral extension in one axial direction of said central section and having a sleeve throughbore of large diameter communicating coaxially with said throughbore of said central section, a connecting section constituting an integral extension in an opposite axial direction of said central section and having a throughbore of large diameter, and surface means providing a tapered annular seat between said throughbore of said central section and said throughbore of said connecting section; and
    a nipple which comprises a cylindrical nipple section having outside diameter approximately equivalent to that of said throughbore of said central section, and an end section which is formed at one end of said nipple section and has outside diameter approximately equivalent to that of said throughbore of said connecting section;
    said nipple section of said nipple adapted to be inserted from said throughbore of said connecting section through said throughbore in said central section into said throughbore of said sleeve section, and said nipple section being coaxially positioned radially inwardly of said throughbore in said sleeve; and
    said end section of said nipple existing as a plastic-worked element so that the outside diameter thereof is adapted to expand while said end section is being axially set into close-fitting engagement with said tapered annular seat, and a radially outer, circumferentially extending portion of said end section and said connecting section in said throughbore thereof, axially adjacent said tapered annular seat are closely joined by an elastic force due to said expansion that acts radially outwardly of said end section and a radially inwardly-directed reaction force of the connecting section.

2. A female-type coupling nipple according to claim 1, wherein:
    said nipple is provided with bulging at one end having cylindrical shape of substantially uniform outside diameter throughout at least an axially-short portion thereof which constitutes said radially outer, circumferentially-extending portion of said end section.

3. A female-type coupling nipple according to claim 1, wherein:
    said end section of said nipple is of funnel shape expanding towards said connecting section.

4. A female-type coupling nipple according to claim 1, wherein:
    said end section of said nipple is constituted by a bulge which has a V-shape or U-shape in axial cross-section.

* * * * *